(12) United States Patent
Gu

(10) Patent No.: US 11,724,759 B2
(45) Date of Patent: Aug. 15, 2023

(54) KICKSTAND FOR BIKES

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 177 days.

(21) Appl. No.: 17/403,883

(22) Filed: Aug. 17, 2021

(65) Prior Publication Data

US 2023/0054613 A1 Feb. 23, 2023

(51) Int. Cl.
*B62H 1/02* (2006.01)

(52) U.S. Cl.
CPC ..................... *B62H 1/02* (2013.01)

(58) Field of Classification Search
CPC ....................................... B62H 1/02
See application file for complete search history.

(56) References Cited

U.S. PATENT DOCUMENTS 3,712,640 A * 1/1973 Shipman ............... B62H 1/06
280/304

FOREIGN PATENT DOCUMENTS

TW 389732 B * 8/1998 ............ B62H 1/02

* cited by examiner

*Primary Examiner* — Kevin Hurley
*Assistant Examiner* — Hosam Shabara

(57) ABSTRACT

A kickstand includes a head, a leg pivotably connected to the head, a clamp connected to the head and a first pad located at the inside of the clamp and facing the head. Multiple screws are threadedly connected to the clamp and each screw includes a contact end. The contact ends of the multiple screws extend beyond the clamp and contact against the first pad to partially deform the first pad. The tube of the chainstay is clamp between the head and the clamp, and the first pad contacts the tube of the chainstay to avoid the kickstand from pivoting or loosening relative to the chainstay.

10 Claims, 8 Drawing Sheets a
KICKSTAND FOR BIKES

BACKGROUND OF THE INVENTION

1. Fields of the Invention

The present invention relates to a kickstand of a bicycle, and more particularly, to a kickstand that is secured to the chainstay firmly.

2. Descriptions of Related Art

The conventional kickstand of a bicycle has a head connected to the bicycle frame such as the chainstay, and includes a leg which is pivotably connected to the head. When parking the bicycle, the leg is kicked downward and contacts the ground, and the leg extends at angle relative to the bicycle so as to support the bicycle. The convention kickstands are disclosed to Taiwanese Utility Models M290841 and M468466, and CN210555274U of China.

However, the shape of the cross section of the chainstay is round, so that the head of the kickstand has to be curve to as to be mounted to the tube of the chainstay, and two bolts are used to secure the tube of the chainstay to the head of the kickstand. Usually the tube of the chainstay is smooth, and the kickstand is difficult to be properly secured to the tube. In other words, the head of the kickstand eventually will slip or loose relative to the tube of the chainstay by vibration or impact. Therefore, the users have to check the tightness of the bolts to ensure that the kickstand functions as expected. On the contrary, if the bolts are overly tightened, the head of the kickstand may be deformed, and the deformed head cannot hold the tube of the chainstay, or even broken.

The present invention intends to provide a kickstand of a bicycle to eliminate shortcomings mentioned above.

SUMMARY OF THE INVENTION

The present invention relates to a kickstand and comprises a head and a leg is pivotably connected to the lower end of the head. A clamp is connected to the head by multiple locking members. A first pad is located at the inside of the clamp and faces the head. Multiple screws are threadedly connected to the clamp and each include a contact end. The contact ends of the multiple screws extend beyond the clamp and contact against the first pad to partially deform the first pad. The tube of the chainstay is clamp between the head and the clamp.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
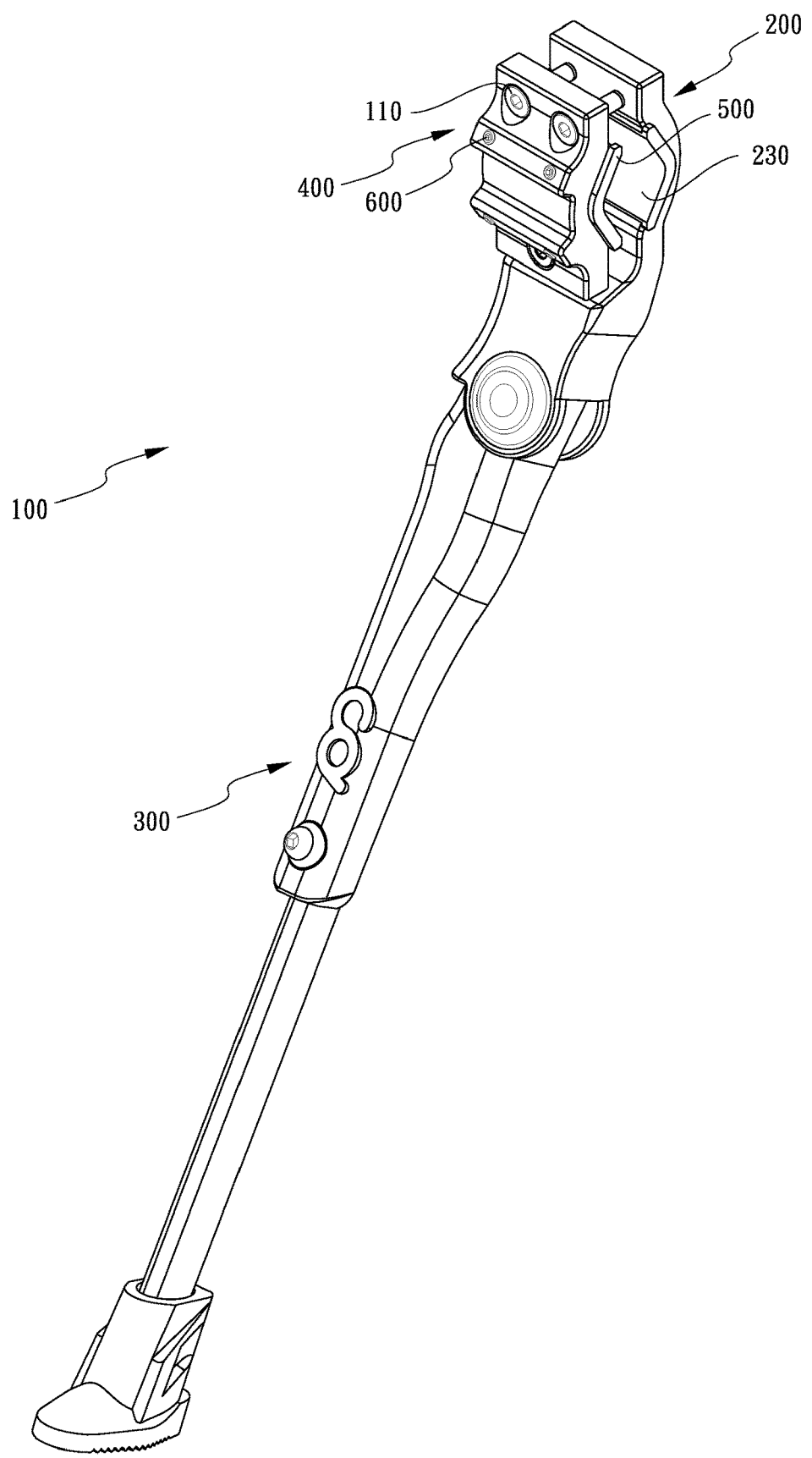
FIG. 1 is a perspective view to show the kickstand of the present invention.
Figure 2:
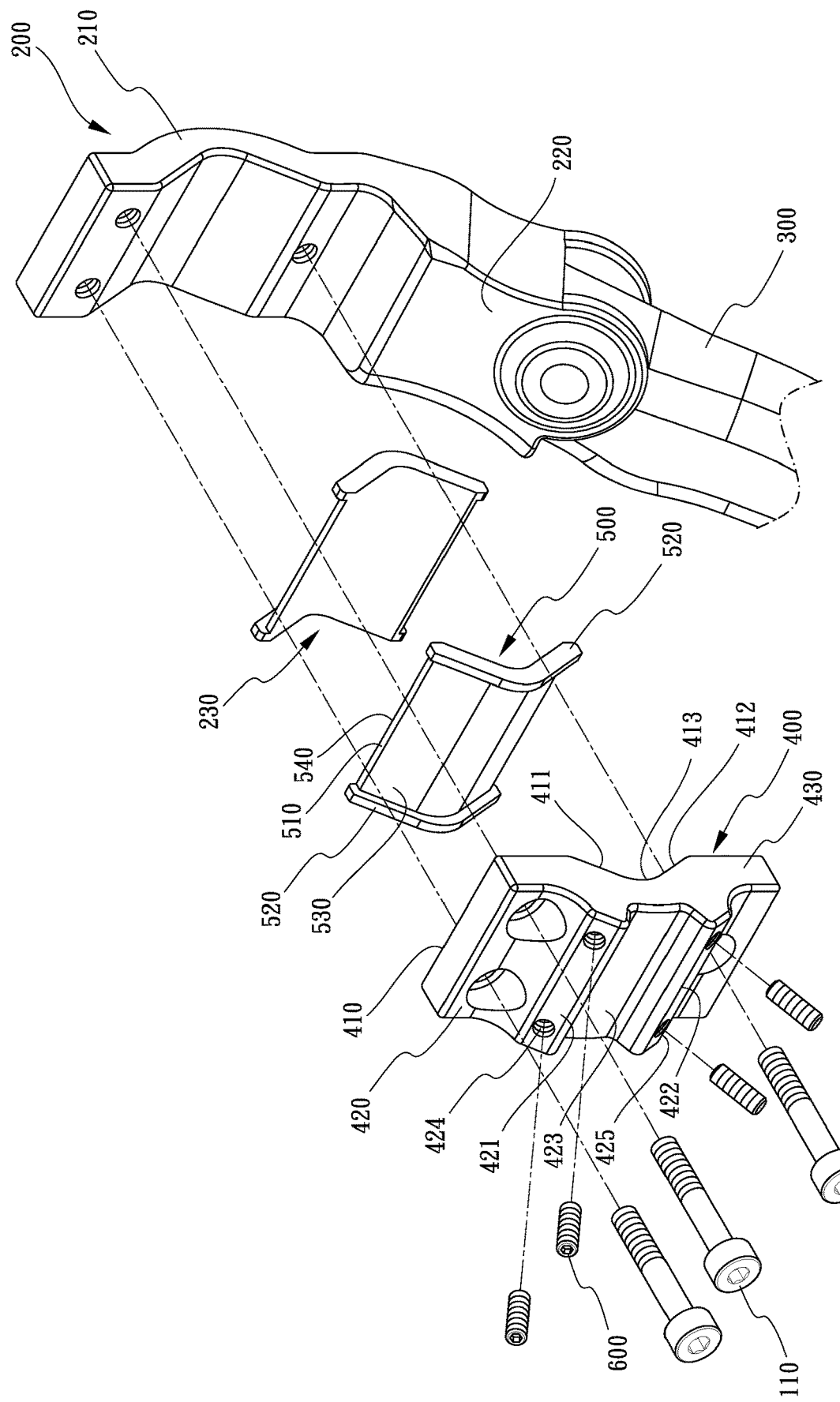
FIG. 2 is an exploded view of the kickstand of the present invention.
Figure 3:
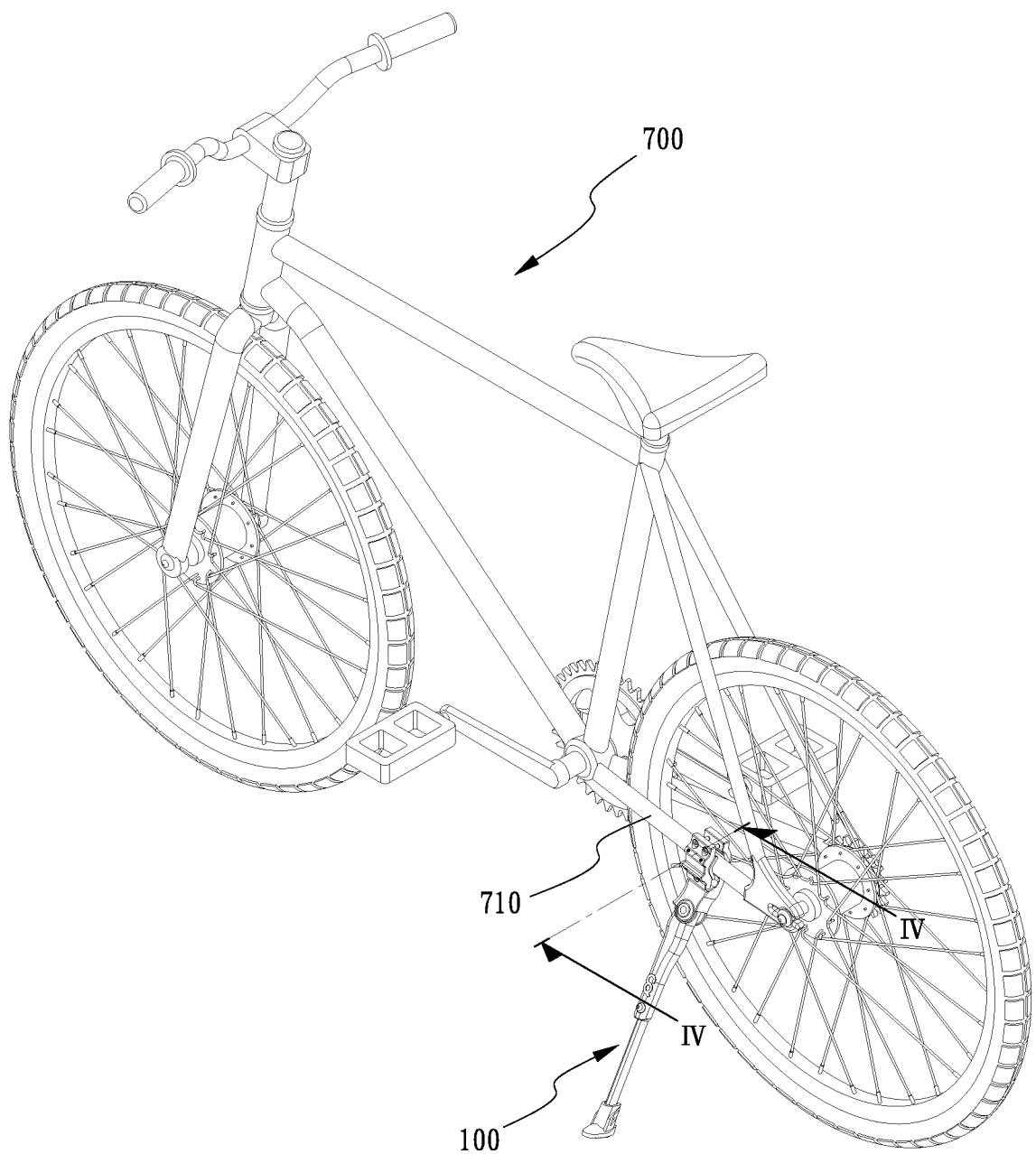
FIG. 3 is a perspective view to show that the kickstand of the present invention is connected to a bicycle.

Referring to FIGS. 1 to 5, the kickstand 100 of the present invention comprises a head 200 and a leg 300 which is pivotably connected to the lower end of the head 200. A clamp 400 is connected to the head 200 by multiple locking members 110. A first pad 500 is located at the inside 410 of the clamp 400 and facing the head 200. Multiple screws 600 are threadedly connected to the clamp 400 and each include a contact end 610 and a driving end 620. The contact ends 610 of the multiple screws 600 extend beyond the clamp 400 and contact against the first pad 500 to partially deform the first pad 500 when the head 200 is mounted to the chainstay 710 of a bicycle 700. In this embodiment, there are three locking members 110, two of the three locking members 110 extend through the clap 400 and go above the chainstay 710 as shown in FIG. 3, and are connected to the head 200. The third one of the three locking members 110 extends through the clap 400 and go below the chainstay 710 and is connected to the head 200. In this embodiment, there are four screws 600.

When installing the kickstand 100 to the bicycle 700, the head 200 is located between the wheel and the chainstay 710, and the clamp 400 is located at outside of the chainstay 710. The bolts 110 extend through the clamp 400 and are threadedly connected to the head 200. The first pad 500 partially contacts the chainstay 710, and then rotating the screws 600 by using a tool (not shown) toward the clamp 400 until the contact ends 610 of the multiple screws 600 extend beyond the clamp 400 and contact against the first pad 500 to partially deform the first pad 500 which contacts against the chainstay 710 of the bicycle 700. There are four contact points of the first pad 500 against the chainstay 710 of the bicycle 700 so that the kickstand 100 does not rotate or slip relative to the chainstay 710.

Specifically, the inside 410 of the clamp 400 includes a first face 411, a second face 412 and a curve face 413 which is formed between the first and second faces 411, 412. By the inside 410 of the clamp 400, the chainstay 710 of different cross sections, such as round tube, oval tube, teardrop shaped tube or polygonal tube can be clamped by the clamp 400 and the head 200 as shown in FIGS. 6 and 7.

The clamp 400 includes an outside 420 which includes a first protrusion 421, a second protrusion 422 and a recessed area 423 formed between the first and second protrusions 421, 422. Multiple first threaded holes 424 are defined through the first protrusion 421 and the first face 411 of the clamp 400. Multiple second threaded holes 425 are defined through the second protrusion 422 and the second face 412 of the clamp 400. The screws 600 are threadedly connected to the first and second threaded holes 424, 425. The axes of the first and second threaded holes 424, 425 extend toward different directions so that the screws 600 contact the first pad 500 and apply forces to the chainstay 710 in different directions to ensure that the chainstay 710 is secured in a balance way. The recessed area 423 reduces weight of the clamp 400. The first and second protrusions 421, 422 are more visible when assembling the clamp 400 to the head 200.

Figure 6:
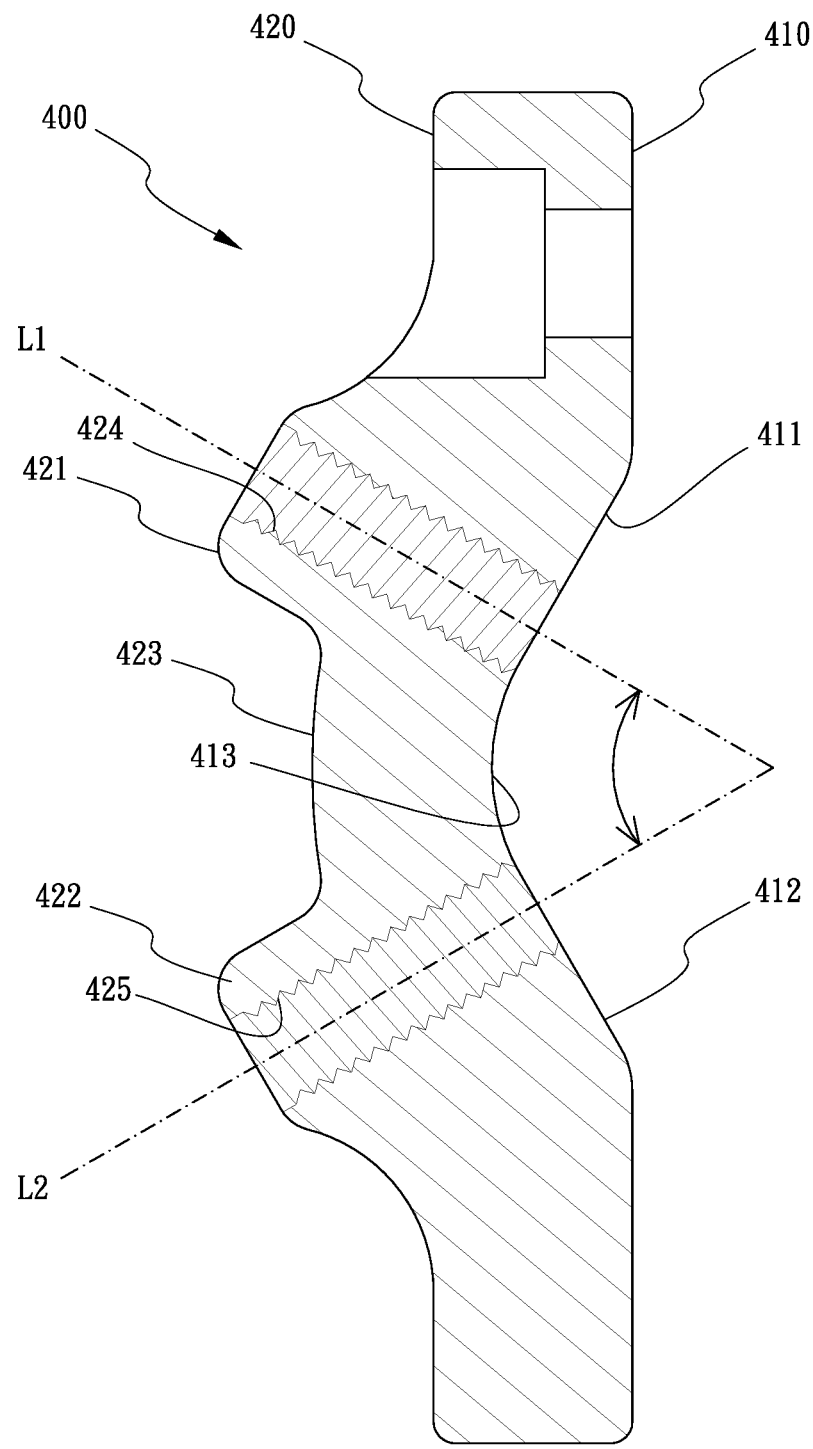
FIG. 6 is a cross sectional view of the clamp of the kickstand of the present invention.
Figure 7:
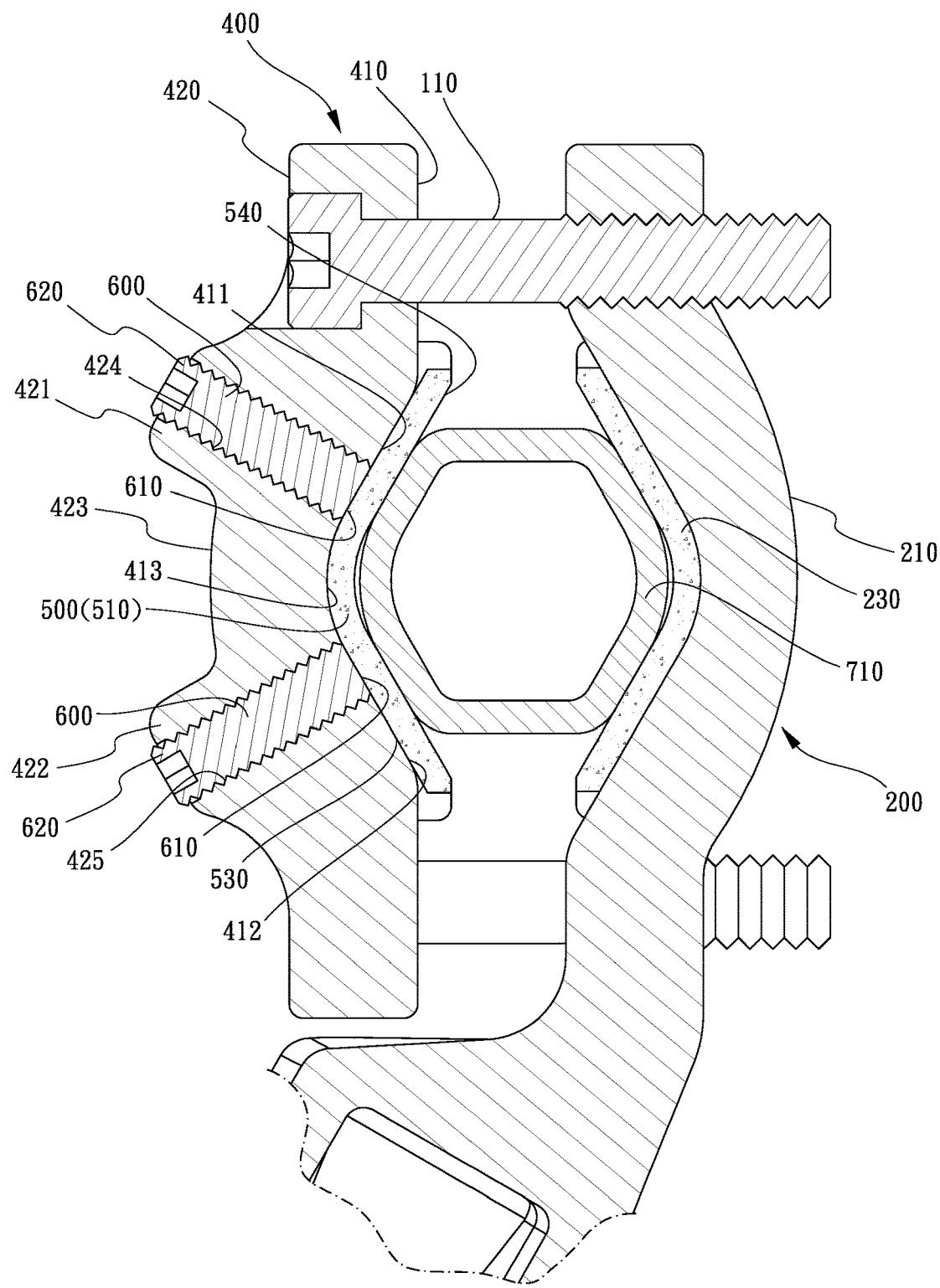
FIG. 7 is a cross sectional view to show that the tube of the chainstay with a polygonal cross section is clamped between the clamp and the head of the kickstand of the present invention.

As shown in FIG. 6, each of the first threaded holes 424 includes a first axis L1, and each of the second threaded holes 425 includes a second axis L2. An angle of 50 degrees to 70 degrees is formed between the first and second axes L1, L2. Preferably, the angle is 60 degrees. Therefore, the screws 600 apply forces to the first pad 500 and the chainstay 710 in multiple directions.

Figure 4:
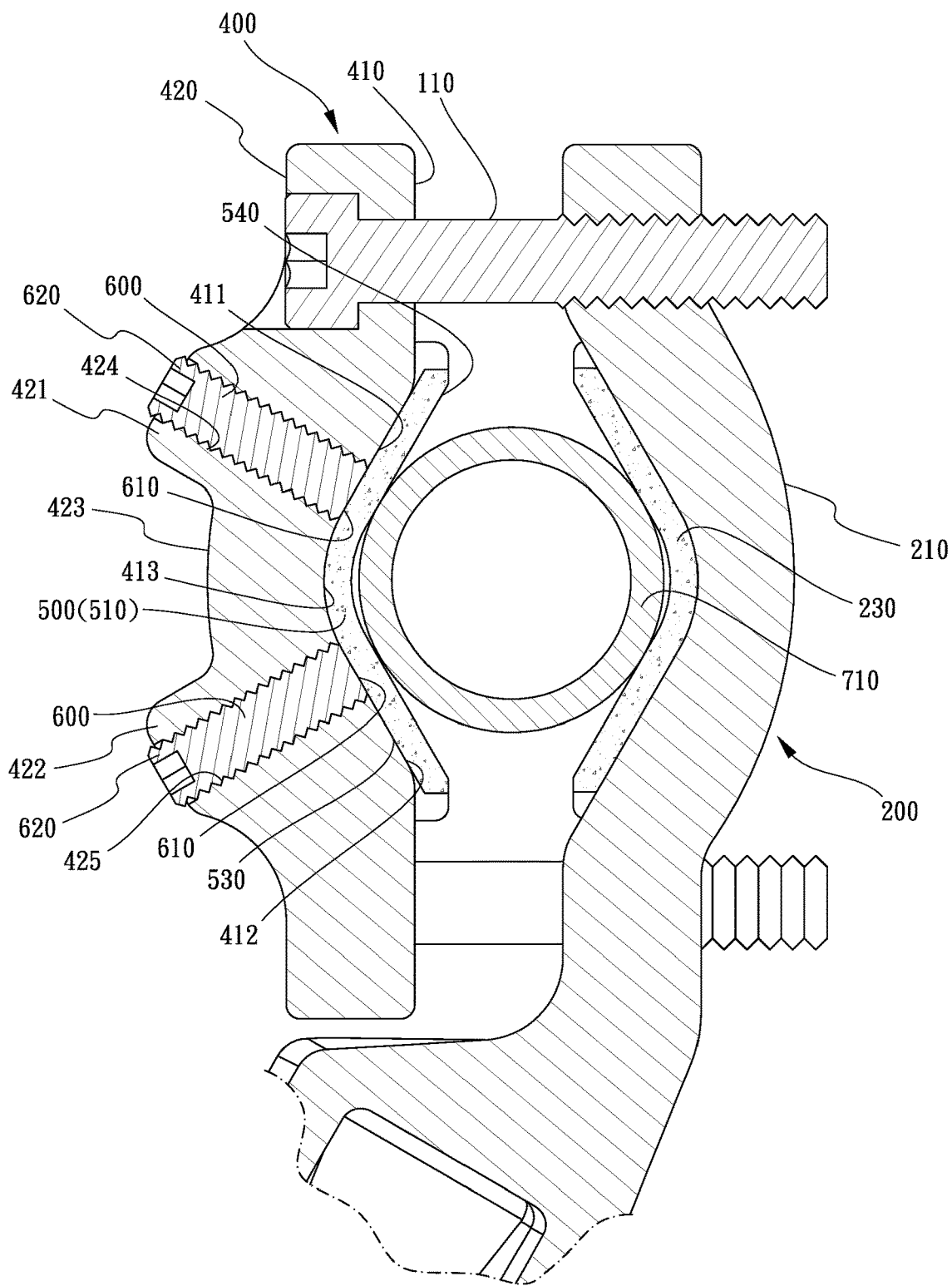
FIG. 4 is a cross sectional view, taken along line IV-IV in FIG. 3.
Figure 5:
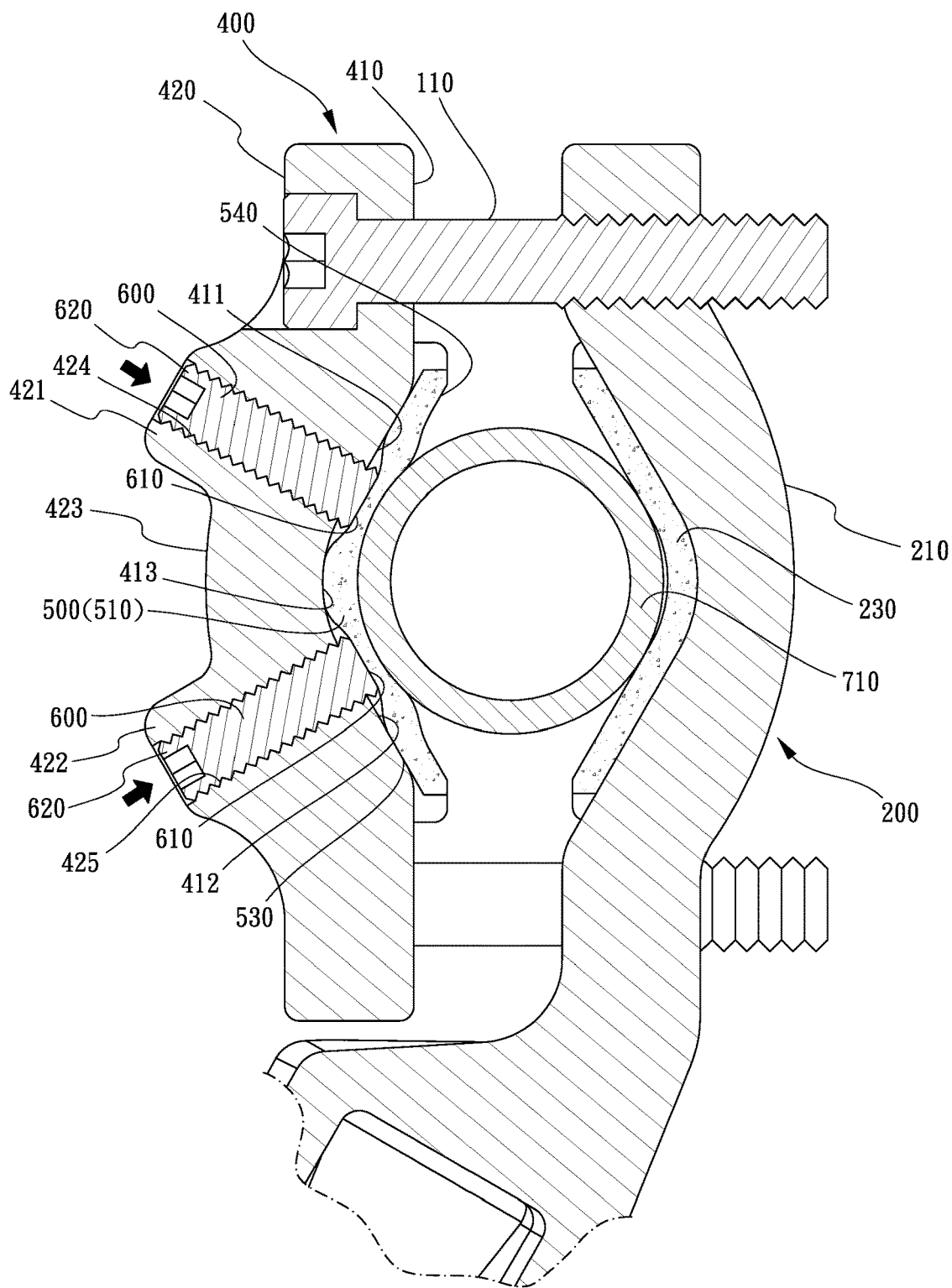
FIG. 5 is a cross sectional view to show that the screws contact against the first pad to clamp the chainstay.

As shown in FIG. 4, when the contact ends 610 of the screws 600 do not protrude beyond the first and second threaded holes 424, 425, the driving end 620 of each of the screws 600 is protruded beyond the outside 420 of the clamp 400 to form the screws 600 as a warning status. When the contact ends 610 of the screws 600 protrude beyond the first and second threaded holes 424, 425, the driving end 620 of each of the screws 600 is not protruded beyond the outside 420 of the clamp 400 to form the screws 600 as a contacting status. The first pad 500 is partially deformed in the contacting status. As shown in FIG. 5, by the warning status and the contacting status of the screws 600, the users can easily tell whether the kickstand 100 is secured to the chainstay 710 or not.

It is noted that the first pad 500 includes a first contact portion 510 and two first lateral portions 520 which are formed to two sides of the first contact portion 510. The first contact portion 510 includes a first outer face 530 and a first inner face 540 which is located opposite to the first outer face 530. The first outer face 530 contacts the inside 410 of the clamp 400. The two first lateral portions 520 respectively contact two lateral sides 430 of the clamp 400. Therefore, the first pad 500 does not shake when it is installed to the inside 410 of the clamp 400.

Figure 8:
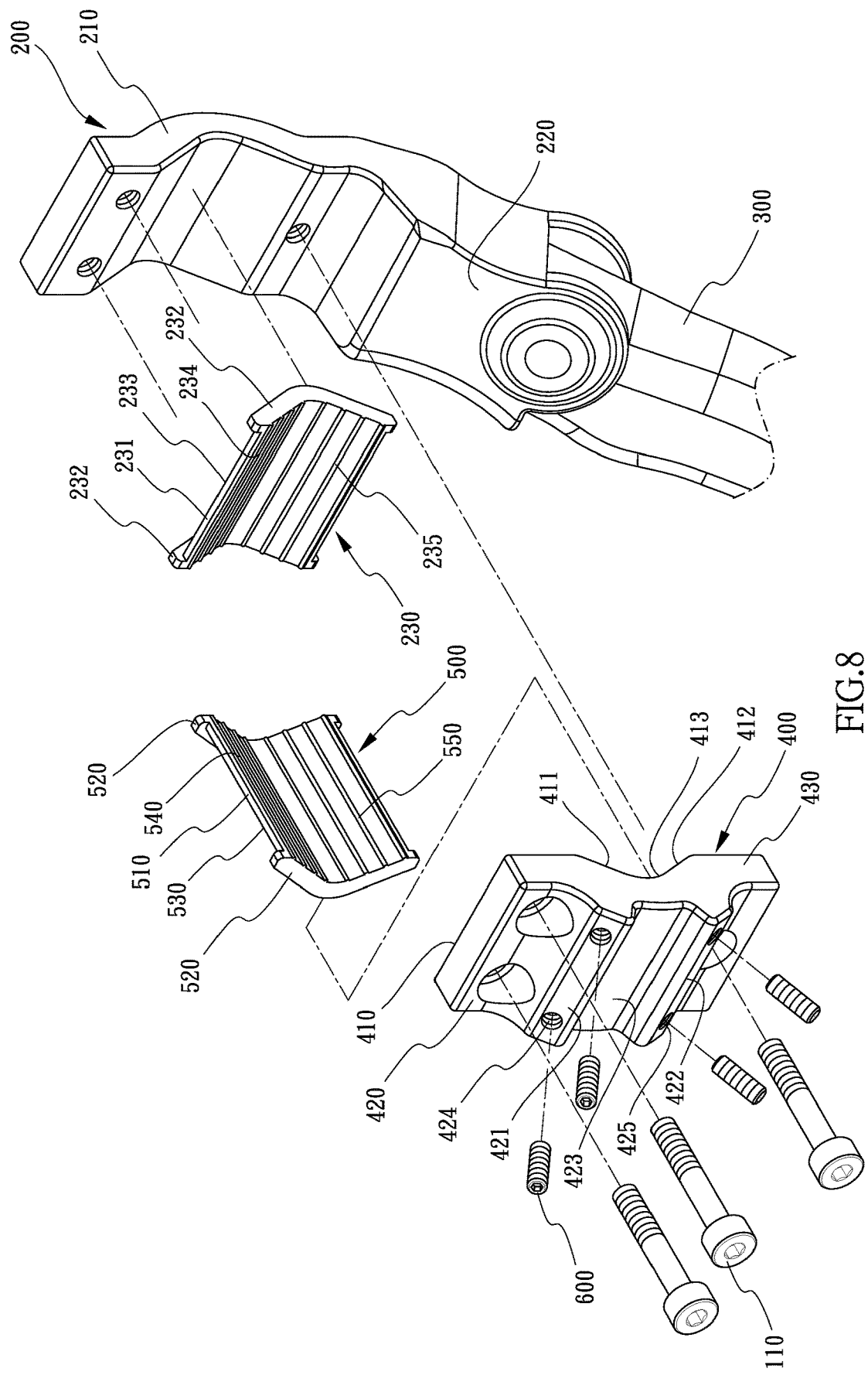
FIG. 8 is an exploded view to show another embodiment of the kickstand of the present invention.

As shown in FIG. 8, the first outer face 530 of the first pad 500 includes separated first ridges 550 protruded toward the two first lateral portions 520. The first ridges 550 provide friction between the first pad 500 and the chainstay 710.

The head 200 of the kickstand 100 includes an extension 210 and a connection end 220. The connection end 220 is connected with the leg 300. The clamp 400 is connected to the extension 210 of the head 200 by multiple bolts. A second pad 230 contacts the extension 210 of the head 200. The second pad 230 includes a second contact portion 231 and two second lateral portions 232 which are formed to two sides of the second contact portion 231. The second contact portion 231 includes a second outer face 233 and a second inner face 234 which is located opposite to the second outer face 233. The second outer face 233 contacts the extension 210 of the head 200. The two second lateral portions 232 respectively contact two sides of the extension 210. The second outer face 233 of the second pad 230 includes separated second ridges 235 protruded toward the two second lateral portions 232. By the first and second pads 500, 230, the kickstand 100 receives forces from two directions to be connected to the chainstay 710.

While we have shown and described the embodiment in accordance with the present invention, it should be clear to those skilled in the art that further embodiments may be made without departing from the scope of the present invention.

What is claimed is:
1. A kickstand (100) comprising:
a head (200);
a leg (300) pivotably connected to a lower end of the head (200);
a clamp (400) connected to the head (200) by multiple locking members (110);
a first pad (500) located at an inside (410) of the clamp (400) and facing the head (200), and
multiple screws (600) threadedly connected to the clamp (400) and each including a contact end (610), the contact ends (610) of the multiple screws (600) extending beyond the clamp (400) and contacting against the first pad (500) to partially deform the first pad (500).

2. The kickstand as claimed in claim 1, wherein the inside (410) of the clamp (400) includes a first face (411), a second face (412) and a curve face (413) which is formed between the first and second faces (411, 412).

3. The kickstand as claimed in claim 2, wherein the clamp (400) includes an outside (420) which includes a first protrusion (421), a second protrusion (422) and a recessed area (423) formed between the first and second protrusions (421, 422), multiple first threaded holes (424) are defined through the first protrusion (421) and the first face (411) of the clamp (400), multiple second threaded holes (425) are defined through the second protrusion (422) and the second face (412) of the clamp (400), the screws (600) are threadedly connected to the first and second threaded holes (424, 425).

4. The kickstand as claimed in claim 3, wherein when the contact ends (610) of the screws (600) do not protrude beyond the first and second threaded holes (424, 425), a driving end (620) of each of the screws (600) is protruded beyond the outside (420) of the clamp (400) to form the screws (600) as a warning status, when the contact ends (610) of the screws (600) protrude beyond the first and second threaded holes (424, 425), the driving end (620) of each of the screws (600) is not protruded beyond the outside (420) of the clamp (400) to form the screws (600) as a contacting status, the first pad (500) is partially deformed in the contacting status.

5. The kickstand as claimed in claim 4, wherein each of the first threaded holes (424) includes a first axis (L1), each of the second threaded holes (425) includes a second axis (L2), an angle of 50 degrees to 70 degrees is formed between the first and second axes (L1, L2).

6. The kickstand as claimed in claim 1, wherein when the contact ends (610) of the screws (600) do not protrude beyond the clamp (400), a driving end (620) of each of the screws (600) is protruded beyond the outside (420) of the clamp (400 to form the screws (600) as a warning status, when the contact ends (610) of the screws (600) protrude beyond the clamp (400), the driving end (620) of each of the screws (600) is not protruded beyond the outside (420) of the clamp (400) to form the screws (600) as a contacting status, the first pad (500) is partially deformed in the contacting status.

7. The kickstand as claimed in claim 1, wherein the first pad (500) includes a first contact portion (510) and two first lateral portions (520) which are formed to two sides of the first contact portion (510), the first contact portion (510) includes a first outer face (530) and a first inner face (540) which is located opposite to the first outer face (530), the first outer face (530) contacts the inside (410) of the clamp (400), the two first lateral portions (520) respectively contact two lateral sides (430) of the clamp (400).

8. The kickstand as claimed in claim 7, wherein the first outer face (530) of the first pad (500) includes separated first ridges (550) protruded toward the two first lateral portions (520).

9. The kickstand as claimed in claim 1, wherein the head (200) of the kickstand (100) includes an extension (210) and a connection end (220), the connection end (220) is connected with the leg (300), the clamp (400) is connected to the extension (210) of the head (200) by multiple bolts, a second pad (230) contacts the extension (210) of the head (200).

10. The kickstand as claimed in claim 9, wherein the second pad (230) includes a second contact portion (231) and two second lateral portions (232) which are formed to two sides of the second contact portion (231), the second contact portion (231) includes a second outer face (233) and a second inner face (234) which is located opposite to the second outer face (233), the second outer face (233) contacts the extension (210) of the head (200), the two second lateral portions (232) respectively contact two sides of the extension (210), the second outer face (233) of the second pad (230) includes separated second ridges (235) protruded toward the two second lateral portions (232).

\* \* \* \* \*